United States Patent [19]
Diehl et al.

[11] Patent Number: 4,570,942
[45] Date of Patent: Feb. 18, 1986

[54] DUAL DIAMETER VALVE STEM PACKING

[75] Inventors: Robert J. Diehl, Wallis; F. Harold Hollister; Danny S. Meyer, both of Richmond, all of Tex.

[73] Assignee: Joy Manufacturing Company, Pittsburgh, Pa.

[21] Appl. No.: 725,721

[22] Filed: Apr. 22, 1985

[51] Int. Cl.[4] .................... F16J 15/10; F16K 41/00
[52] U.S. Cl. .................................... 277/12; 277/26; 277/105; 277/112; 277/124; 277/125; 251/214
[58] Field of Search ............... 251/214; 277/58, 59, 277/26, 105, 106, 110–112, 123–125

[56] References Cited

U.S. PATENT DOCUMENTS

| | | | |
|---|---|---|---|
| 2,684,274 | 7/1954 | Saxon | 277/58 X |
| 3,019,739 | 2/1962 | Prosser | 277/124 X |
| 3,175,573 | 3/1965 | Vater | 277/110 X |
| 3,752,507 | 8/1973 | Maurer et al. | 277/59 X |
| 4,379,557 | 4/1983 | Saka | 251/214 X |

FOREIGN PATENT DOCUMENTS 620318 1/1927 France ............................. 277/59

Primary Examiner—Robert S. Ward
Attorney, Agent, or Firm—Marvin J. Marnock

[57] ABSTRACT

A "fire-resistant" packing arrangement (30) for use with linear motion or rotary motion shafts (20) characterized by a stepped dual diameter packing chamber provided by successive enlargements of the stem bore (22). A primary packing assembly (31) disposed in the chamber section (20b) of smaller diameter and cross-sectional areas and located nearest the fluid pressure provides for sealing under normal temperature and operating conditions. A secondary packing assembly (32) in the larger diameter chamber section (20c) and fabricated of "high temperature" materials is adapted to maintain sealing effectiveness in the event of abnormally high temperatures. A packing support ring (35) disposed in the larger diameter chamber section (20c) intermediate the two packing assemblies and supportable on the shoulder (62) provided by the stem bore enlargement, supports the secondary packing (32) and in the event of a decomposition of the primary packing (51) induced by extreme temperature conditions permits the secondary "high temperature" packing to maintain a seal. A packing retainer ring (38) located at the outer end of the packing arrangement as an outer packing stop is axially adjustable to provide a preload energization of the primary packings.

5 Claims, 2 Drawing Figures

DUAL DIAMETER VALVE STEM PACKING

BACKGROUND OF THE INVENTION

The invention relates to packings between a shaft and housing, and more specifically to a packing arrangement adapted for either linear motion or rotary motion shafts for sealing between the shaft and housing at normal temperature operating conditions and also at abnormally high temperature conditions as might be encountered in an emergency operating condition such as a fire.

Heretofore, there have been a wide variety of packing assemblies and arrangements for providing for sealing between a valve stem and valve body at high temperatures. It is also well known to use two sets of packings separated by a lantern ring or the like which is connectable to an external source of lubricant or other injectible substance to enhance sealing effectiveness. Such an arrangement is shown in U.S. Pat. No. 4,379,557 which incorporates both low temperature and high temperature packing assemblies. High temperature packing assemblies normally require a preload by means of axial compression to effect a seal. It is characteristic of the arrangement, however, that the high temperature packing assembly will lose its energization and sealing effectiveness in the event of a decomposition of the low temperature packing due to the failure of its material for the high temperature packing and resulting loss of axial compression since the fluid pressure from the flowline or other pressure source will rarely act to pressure energize the high temperature packing.

It is an object, therefore, of the present invention to provide a packing arrangement which is reliably effective for sealing between a shaft and housing at normal temperature operating conditions as well as high temperature operating conditions.

It is another object to provide a packing arrangement of low temperature and high temperature packing assemblies which are tandemly disposed in a single packing chamber and which will reliably maintain energization and sealing effectiveness of the high temperature conditions which cause decomposition of the low temperature packings.

It is a further object to provide a packing arrangement of both low temperature and high temperature packing assemblies tandemly disposed in a single packing chamber which is characterized by a stepped dual diameter configuration for housing the low temperature and high temperature packing assemblies in the smaller and larger diameter sections thereof, respectively, and includes a reliable packing support between the two packing assemblies to permit retention of sealing effectiveness of the high temperature packing assembly in the event of a decomposition of the low temperature packing.

The invention is a "fire-resistant" packing arrangement which features a unique stuffing box configuration and packing assembly adapted for sealing around linear motion or rotary motion shafts such as valve stems. The bore through which the shaft or valve stem extends is successively enlarged to provide a "stepped" dual diameter packing chamber for receiving successive stem packings therein. A primary packing structure in the smaller diameter chamber section located nearest the fluid pressure provides for primary sealing under normal temperature and operating conditions. Secondary sealing under abnormally high temperatures and operating conditions is provided by a secondary packing assembly disposed in the chamber section of greater cross-sectional area. A packing support ring located intermediate the two packing assemblies and adapted to be supported on the radial shoulder provided by the enlargement of the valve stem bore permits the secondary packing to remain energized and maintain a seal in the event of a decomposition of the primary packing due to abnormally high temperatures. A radial shoulder formed by the valve stem bore or shaft bore provides an inner packing stop. A packing retainer ring which is threaded into the bore at the other end of the packing arrangement provides an outer packing stop which is axially adjustable to establish initial energization of the packings.

BRIEF DESCRIPTION OF THE DRAWINGS

The accompanying drawings, which are incorporated in and form a part of the specification, illustrate a preferred embodiment of the invention and, together with the description, serve to explain the principles of the invention. In the drawings.

DESCRIPTION OF A PREFERRED EMBODIMENT

Figure 1:
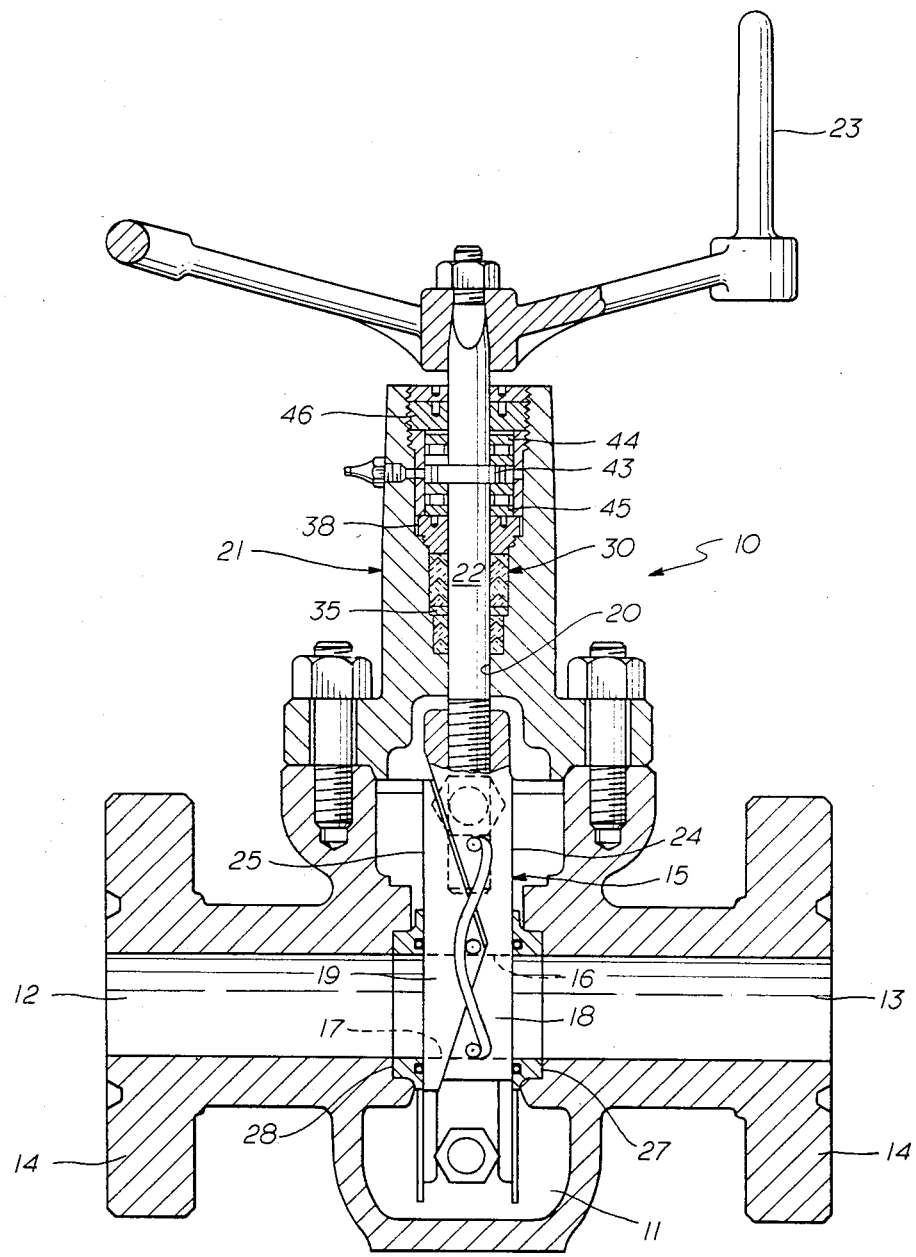
FIG. 1 is a vertical plan view, partly in section, of a non-rising stem type expanding gate valve in which the packing assembly of the invention is utilized.

Referring to the drawings in greater detail, the invention is illustrated herein in connection with a non-rising stem gate valve of conventional type which uses the principle of parallel expanding gates for obtaining a positive mechanical seal on both the upstream and downstream sides of the gate assembly.

The valve in FIG. 1, which illustrates a typical application of the novel valve stem packing structure of this invention includes a valve body 10 provided with a valve chamber 11 and inlet and outlet flow passages 12 and 13 which open to the valve chamber 11. Flanges 14 at opposed ends of the valve body provide means for connecting the valve in a flowline.

Within the valve chamber 11, a gate assembly 15 is mounted for sliding movement transversely of the flow passages 12, 13 to open or close the valve. The gate assembly comprises a gate member 18 and a segment 19. At its upper end, the gate member 18 is connected to a valve stem 22 which extends through the valve bonnet 21 and the axial bore 20 provided therefor. The bonnet 21 is bolted atop the valve body 10 and closes the upper end of the valve chamber 11. The stem 22 is provided at its upper end with a valve actuating member such as a handwheel 23 and at its other end is threadedly connected to the gate member 18 so that upon rotation of the handwheel, the gate assembly is moveable across the flow way to open or close the valve. As is well known to those skilled in the art, the stem is threadedly connected to the gate member in a fashion so that rotation of the stem will cause the gate to move relative to the stem in a direction along the longitudinal axis of the stem. One such suitable connection is shown in U.S. Pat. No. 4,376,524. In the valve open position, ports 16, 17 in the gate and segment members, respectively, are aligned in registry with the inlet and outlet passages 12 and 13.

As is typical of most expansible gate assemblies, the gate member 18 is provided with a V-shaped recess which accommodates the wedge-shaped segment 19, the wedge faces of which conform to the surfaces of the V-shaped recess and are adapted to be in contact therewith when the gate assembly is in the non-expanded condition. Also, characteristically, the linear movement of the gate assembly to open or close the valve causes an expansion of the gate assembly in both its open and closed positions due to relative sliding movement between the gate and segment members 18 and 19, the sliding movement being induced by suitable stops (not shown) in the valve chamber 11 which limit the vertical movement of the segment 19 relative to the gate member 18. When the gate assembly is thus expanded, flat outwardly facing sealing surfaces 24, 25 of the gate and segment members, respectively, are disposed in sealing engagement with the faces of seat rings 27 and 28 mounted in annular recesses which surround the flow passages 12 and 13 and open to the valve chamber 11.

For utilizing the packing arrangement 30 of this invention, the bonnet bore 20 through which the valve stem 22 extends is successively enlarged to provide a plurality of bore sections 20a, 20b, 20c, and 20d. At one end of the bore section 20a opens to the valve chamber 11 and is of a diameter which snugly accommodates the valve stem 20. Adjacent the bore section 20a is the section 20b of larger diameter which accommodates a primary packing assembly 31. The packing assembly 31 is of a design and materials selected to provide sealing capability and long cycle life under normal operating conditions.

A further enlarged bore section 20c, adjacent the bore section 20b, accommodates a secondary packing assembly 32 which is of a design and materials selected to provide sealing under extreme or unusual conditions, such as exposure to extreme temperatures, radiation, or chemicals which would react with the primary seal materials.

To provide support for the secondary packing, a metal support ring 35 is seated in the bottom of the bore section 20c. The inner diameter of the support ring 35 is only slightly larger than the valve stem diameter so as to snugly accommodate the valve stem.

A further enlarged bore section 20d of the bonnet bore 20 adjacent the section 20c is provided with internal threads 36 and receives a metal retainer ring 38 which is provided with cooperating external threads 39 in the central portion thereof. At one end the retainer ring 38 includes a smaller external portion 38a which is adapted to fit snugly within the bore section 20c.

To facilitate installation, the other end of the retainer ring 38 is provided on its face with a pair of blind bores 41 adapted to receive a tool for installing or removing the retainer ring.

It is also to be noted that the valve stem 22 is provided with a radial collar 43 which is mediately disposed between upper and lower thrust bearings 44, 45, respectively, contained within the enlarged diameter bore section 20d. A bearing retainer ring 46 is threaded into the upper end of the bore section 20d and is provided with a central opening for accommodating the valve stem 20. By the selective rotation of the handwheel 23 and the valve stem 22 which extends from the gate assembly 15 through the bonnet bore sections 20a, 20b 20c and 20d and the central opening in the bearing retainer ring, the gate assembly is moved across the flow way to open or close the valve.

Figure 2:
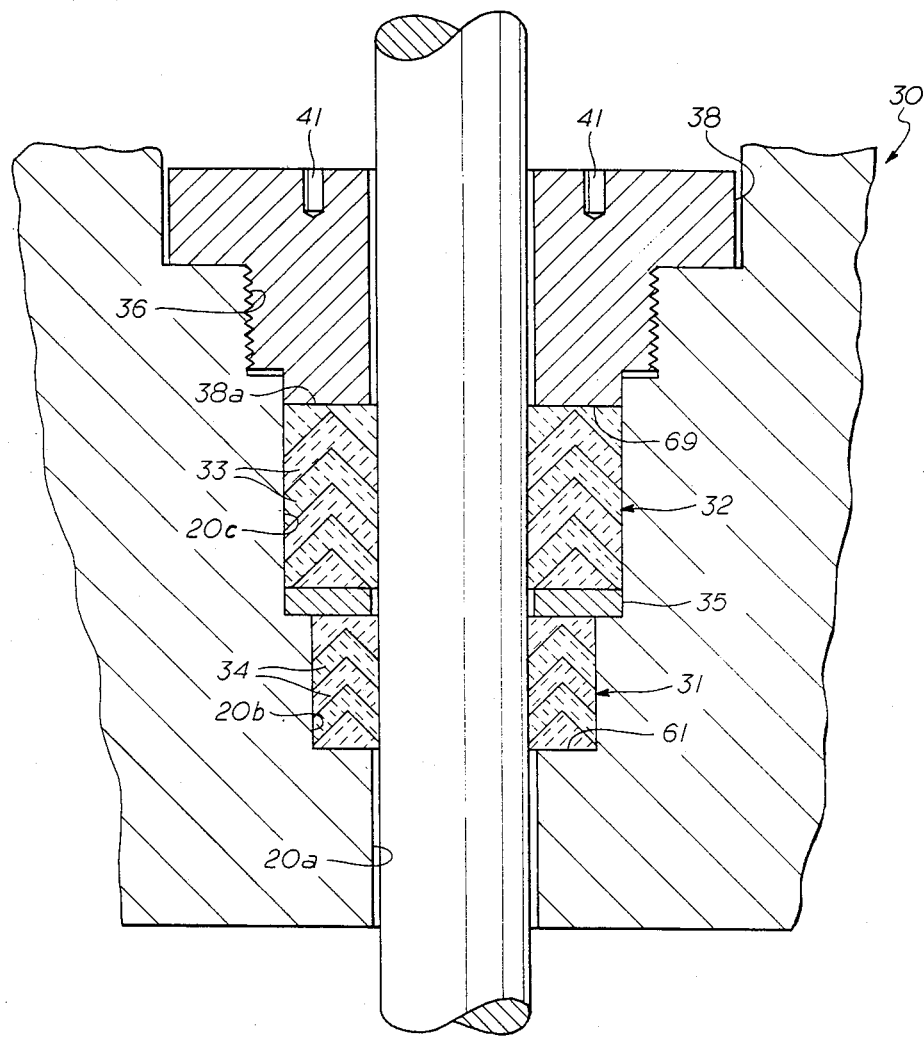
FIG. 2 is an enlarged detailed sectional view of the packing assembly of the invention as it is used in the gate valve illustrated in FIG. 1.

As best shown in FIG. 2, the packing arrangement 30 representing the invention comprises the primary packing assembly 31 disposed in the smaller diameter chamber section 20b and the secondary packing assembly 32 which is disposed in the larger diameter chamber section 20c. The enlargement of the stem bore 20 to provide the packing chamber section 20b forms a radial shoulder 61 which constitutes a packing stop at the inner end of the packing arrangement nearest the flow passage through the valve. The further enlargement of the stem bore 20 to form the packing chamber section 20c provides a radial shoulder 62 on which is seated the steel packing support ring 35 intermediate the two packing assemblies 31, 32. The central opening of the ring 35 is slightly larger than the cross-section diameter of the stem 20 so as to provide a diametral clearance of approximately 0.01 inch to 0.03 inch. A snug but loose fit is thereby provided.

At the other end of the packing arrangement 30 the metal retainer ring 38 is provided which forms an outer packing stop. The stem bore section 20d is internally threaded for accommodating the retainer ring 38 which is threaded therein.

It will thus be seen that the packing retainer ring 38 is axially adjustable within the bore 20 such that a preload may be applied to the packing assembly 32 by the engagement of the inner end face 60 of the retainer 38 with the high temperature packing assembly 32. To facilitate the installation of the retainer ring 38 and the application of loading to the secondary packing assembly, the outer end face 40 of the retainer ring 38 is provided with blind bores 41 for accommodating a suitable tool. Preloading of the primary packing assembly is conventionally accomplished by design of the packing rings with such diameter as to effect an interference in the radial direction with the stem and internal wall of the bore.

The materials selected for the primary packing assembly 31 and the design thereof may be of any conventional materials and design as will provide an effective shaft seal under normal temperature operating conditions. Various elastomeric materials such as epichlorohydrin or polymeric materials such as Teflon are known to be suitable for this purpose. A preferred configuration for the packing is a plurality of packing rings of 33 V-shaped radial cross section arranged in stacked, nested relationship with one another which sealingly engage the inner wall of the packing chamber section 20b and the surface of the valve stem 22. The primary packing 31 is thus suited to provide effective sealing under normal temperature conditions to approximately 300° F. (149° C.) at which temperature the packing materials begin to decompose.

The secondary packing assembly 32 is fabricated of high temperature resistant materials such as graphite or asbestos. These also may be in the form of V-shaped packing rings 34 but other configurations may be used. While the secondary packing will not generally perform as well as the primary packing under normal temperature conditions, it is adapted to provide effective sealing at temperatures far above 300° F. (149° C.). Accordingly, in the event of an abnormally high temperature condition which causes the primary packing to decompose, the high temperature packing assembly will remain energized and provide effective sealing. This feat is made possible by virtue of the dual diameter configuration and the presence of the packing support ring 35 which keeps the loading on the secondary packing assembly even though the primary packing has disintegrated. While excessively high temperatures have been cited as an abnormal condition which leads to decomposition of the primary packing materials, it is to be understood that the invention has application for providing sealing under other abnormal conditions which lead to a disintegration of the primary packing materials, such as exposure to destructive chemicals or radioactivity.

It will, therefore, be seen that a new and improved packing arrangement is disclosed herein which is particularly adapted as a "fire-resistant" packing for sealing between a shaft and housing at both low temperature normal operating conditions and also at abnormally high temperatures and other deleterious conditions. The unique stepped configuration of the packing chamber provides for tandemly arranged chamber sections and packing assemblies of different cross-sectional area and makes possible the provision of means for providing a positive support for the larger diameter secondary packing and the retention of its sealing effectiveness even though there is a disintegration of the primary packing.

While the invention has been illustrated with respect to a non-rising stem valve wherein the valve stem is limited to only rotary movement about its axis, the unique packing structure of the invention also has applicability to rising stem valves wherein the valve stem is subjected to longitudinal movement for opening or closing the valve. It could also be used with ball valves or slab gate valves.

It is also to be understood that the foregoing description of the invention has been presented for purposes of illustration and explanation and is not intended to limit the invention to the precise form disclosed as changes in details of the illustrated construction may be made by those skilled in the art, within the scope of the appended claims, without departing from the spirit of the invention.

What is claimed is:

1. A packing arrangement for a valve stem which extends through a packing chamber formed in the valve stem bore of a valve housing having a flow passage therethrough and a valve element secured to the valve stem and mounted within said housing for opening or closing the flow passage, said packing chamber being provided with packing stops at its opposite ends and characterized by a stepped dual diameter configuration formed by successive enlargements of the valve stem bore, with one enlargement of the bore providing a first packing chamber section located nearest the flow passage and the other enlargement providing a second packing chamber section of larger diameter and cross-sectional area than said first packing chamber section which is adjacent thereto, one of said packing stops being an inner packing stop exposed to the fluid pressure of the flow passage and the other packing stop being an outer packing retainer ring located at the other end outwardly of the inner packing stop with respect to the flow passage and being axially adjustable with respect to said bore, said packing arrangement further including:

a primary packing assembly positioned within the first packing chamber section between the valve stem and the chamber wall is surrounding relation to said valve stem and in engagement with said inner packing stop and fabricated of layers of elastomeric or polymeric materials suitable for providing primary sealing under normal temperature operating conditions;

a rigid packing support ring loosely received about the valve stem and positioned within the second packing chamber section outwardly of said low temperature packing assembly and in engagement therewith;

a secondary packing assembly positioned within the second packing chamber section between the valve stem and the wall of the packing chamber in surrounding relation to the valve stem and located outwardly of said support ring so as to be sandwiched between said outer packing stop and said support ring and fabricated of materials suitable to provide sealing under abnormally high temperatures, said outer packing retainer ring being axially adjusted to a position whereby said primary packing assembly is energized in sealing contact with the valve stem and chamber wall at normal temperature conditions below the decomposition temperature of the primary packing materials, and said secondary packing assembly is energized in sealing contact with the valve stem and chamber wall to provide a sealing relationship therewith at abnormally high temperature conditions which impair the stem sealing relationship of the primary packing assembly so that the packing structure will not leak flow passage fluid when subjected to abnormally high temperatures and pressures.

2. The packing structure of claim 1 wherein said secondary packing assembly is comprised of a plurality of packing rings in stacked relationship to one another, each said packing ring being formed from grapite or asbestos materials.

3. The packing structure of claim 2 wherein said elastomeric or polymeric material in the primary packing assembly has a decomposition temperature of approximately 300° F. (149° C.).

4. The packing structure as recited in claim 3 wherein said primary packing assembly is comprised of a plurality of V-shaped layers of elastomeric or polymeric material in stacked, nested relation to one another.

5. The packing structure as recited in claim 4 wherein said secondary packing assembly comprises a plurality of V-shaped packing rings in stacked, nested relationship with one another.

* * * * *